(12) United States Patent
Singh et al.

(10) Patent No.: US 8,549,119 B1
(45) Date of Patent: Oct. 1, 2013

(54) ERROR HANDLING FOR DEVICE MANAGEMENT CONFIGURATION AND OPERATIONAL DATA RETRIEVAL COMMANDS

(75) Inventors: Vivek Singh, Mathura (IN); Subodh Kumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 583 days.

(21) Appl. No.: 12/755,269

(22) Filed: Apr. 6, 2010

(51) Int. Cl.
*G06F 15/177* (2006.01)
*G06F 15/173* (2006.01)

(52) U.S. Cl.
USPC .......................... 709/222; 709/223; 709/224

(58) Field of Classification Search
None
See application file for complete search history.

(56) References Cited

U.S. PATENT DOCUMENTS

| | | | | |
|---|---|---|---|---|
| 5,802,309 | A * | 9/1998 | Cook et al. | 709/232 |
| 6,574,662 | B2 * | 6/2003 | Sugiyama et al. | 709/223 |
| 7,310,670 | B1 * | 12/2007 | Walbeck et al. | 709/225 |
| 7,752,024 | B2 * | 7/2010 | Ball et al. | 703/13 |
| 7,779,102 | B2 * | 8/2010 | Nogawa | 709/223 |
| 2003/0023605 | A1 | 1/2003 | Sternin et al. | |
| 2003/0041134 | A1* | 2/2003 | Sugiyama et al. | 709/223 |
| 2003/0069963 | A1* | 4/2003 | Jayant et al. | 709/224 |
| 2005/0198238 | A1* | 9/2005 | Sim et al. | 709/222 |
| 2005/0228885 | A1 | 10/2005 | Winfield et al. | |
| 2006/0190553 | A1 | 8/2006 | Kojima | |
| 2006/0235971 | A1 | 10/2006 | McCloghrie et al. | |
| 2008/0043634 | A1 | 2/2008 | Wang et al. | |
| 2008/0195745 | A1 | 8/2008 | Bowra et al. | |
| 2010/0023581 | A1 | 1/2010 | Lahav | |
| 2010/0260066 | A1* | 10/2010 | August et al. | 370/254 |

OTHER PUBLICATIONS

Godura, Ruchir and Sethi, Adarshpal S. "Use of Control Variables to Convey Protocol Semantics in SNMP," Oct. 1995, IEEE, pp. 1-11.*
McCloghrie et al., "Structure of Management Information Version 2 (SMIv2)," RFC 2578, Network Working Group, Apr. 1999, 43 pp.
Presuhn et al., "Version 2 of the Protocol Operations for the Simple Network Management Protocol (SNMP)," RFC 3416, Network Working Group, Dec. 2002, 32 pp.
Sprenkels et al., "Bulk Transfers of MIB Data," Communication Systems Division (SSC) CH-1015 Lausanne, Switzerland, Mar. 1999, 11 pp., http://infoscience.epfl.ch/record/198/files/TR99_009.pdf.
Schonwalder, "Extending SNMP to Support Bulk MIB Data Transfers," presented on behalf of the Network Management Research Group (NMRG), Jul. 2000, 9 pp., http://www.irtf.org/charters/management.html.

(Continued)

*Primary Examiner* — Azizul Choudhury
(74) *Attorney, Agent, or Firm* — Shumaker & Sieffert, P.A.

(57) ABSTRACT

An example network management device includes a network management module, and a reconstruction module. The network management module is configured to generate a data retrieval command to direct a managed device to retrieve a set of management variables stored within a database within the managed network device and send the data retrieval command to the managed device. The reconstruction module is configured to receive a plurality of partial responses generated by a deconstruction module of the managed device in response to receiving the data retrieval command and determining that the set of management variables does not fit in a single response, and combine the received plurality of partial responses into the requested set of management variables, wherein each of the plurality of partial responses is received as a separate message from the managed network device and includes a different portion of the requested set of management variables.

29 Claims, 6 Drawing Sheets

(56) References Cited

OTHER PUBLICATIONS

Jagadish et al,. "Network Management Traffic Optimization," Proc. of 14th National Conf. on Communications, NCC-2008, IIT Bombay, Feb. 1-3, 2008, 5 pp.

Case et al., "Protocol Operations for version 2 of the Simple Network Management Protocol (SNMPv2)," RFC 1448, Apr. 1993, 36 pp.

U.S. Appl. No. 12/688,635, by Uday Kishore Kumbhari, filed Jan. 15, 2010.

Schonwalder et al. "SNMP Traffic Analysis: Approaches, Tools, and First Results", Computer Science, Jacobs University, Bremen, Campus Ring 1, 28759 Bremen, Germany, IEEE 2007, 10 pgs.

\* cited by examiner

ERROR HANDLING FOR DEVICE MANAGEMENT CONFIGURATION AND OPERATIONAL DATA RETRIEVAL COMMANDS

TECHNICAL FIELD

The invention relates to computer networks and, more particularly, to techniques for configuring and managing network devices.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

A conventional network device, such as a router, typically includes a mechanism, such as a management interface, to locally or remotely configure the device. By interacting with the management interface, various clients, such as human users and automated scripts, can perform configuration tasks. For example, the clients may configure interface cards of the device, adjust parameters for supported network protocols, specify physical components within the device, modify routing information maintained by a router, access software modules and other resources residing on the device, and perform other configuration tasks.

The Simple Network Management Protocol (SNMP) is a standard defined by the Internet Engineering Task Force (IETF) for managing network devices. SNMP uses an extensible design that incorporates management information bases (MIBs) to define and store management data that is available in a managed device. Specifically, MIBs describe the structure of the management data of a network device by using a namespace that contains object identifiers. Each object identifier identifies a variable of management data within the network device that can be read or set by the client via SNMP, where the variable represents a specific characteristic (e.g. configurable parameter) about the managed device. MIBs typically manage two basic types of objects; scalar objects and tabular objects. Tabular objects define multiple related object instances and group them into MIB tables, sometimes called SNMP tables. MIBs are often hard-coded into a managed device, and a unique MIB typically exists for each management format area implemented by a management device. Management devices, such as computer consoles, utilize SNMP MIBs to manage devices of a network, such as routers, switches, and other network devices.

The SNMP standard defines several commands that an SNMP management application running on an SNMP management system must support for managing remote network devices. The SNMP management application issues the commands to an SNMP agent executing on the managed device. In the SNMP standard, these commands include Get, GetNext, Set, and GetBulk. When issued by the SNMP management application, the Get and GetNext commands, for example, each retrieve one or more scalar or tabular objects from a row of a MIB of the targeted network device.

The remote network device may prepare a response to a received a Get or GetNext command issued by the SNMP management application. If the request, i.e., a Get or GetNext command, requests more information than will fit within a single response, the remote network device may return a "tooBig" error in accordance with the SNMP standard. On receiving the tooBig error, the management application may split the original request into multiple requests to re-request the same information in smaller pieces, causing additional network traffic. If the original request included a request for a single management variable and the response varbind is too large to fit in a single response PDU, then the management application may not be able to retrieve the requested management variable from the remote network device.

SUMMARY

In general, techniques are described that enable more effective use of network management commands for the retrieval of management data. The techniques may be particularly useful for network management commands that may retrieve more management data than may fit in a single response. For example, the techniques may be applied to the SNMP Get or GetNext commands to optimize the efficiency of the commands and improve error handling. In one example, the techniques may be applied using an SNMP management device interacting with an SNMP software agent executing on an SNMP managed device. Rather than solely return an error message to the SNMP management device, the SNMP agent may fragment a response to an SNMP Get or GetNext command into multiple response protocol data units (PDUs) when the response is too large to fit within a single response PDU. The SNMP agent then sends the multiple response PDUs to the SNMP management device in a format that allows the SNMP management device to readily reassemble the response PDUs into a single response. In this manner, the techniques of this disclosure may optimize the resources on both the SNMP management device and the SNMP managed device and minimize the network bandwidth required, while ensuring that all variables requested by an SNMP managed application may be returned to the SNMP managed application by the SNMP agent.

In an example operation, an SNMP management device issues a command to direct an SNMP agent executing on a managed network device to retrieve a set of management information. The set of management information may include a set of configuration and/or operational information. The command includes a request identifier that uniquely identifies that particular request associated with the command. The SNMP agent receives the request for the set of management information, retrieves the set of management information, and determines if the entire set of management information fits within a single response PDU.

If the set of management information will not fit within a single response PDU, the SNMP agent generates an initial response PDU corresponding to an SNMP "tooBig" error message and sends the initial response PDU to the SNMP management device. If the SNMP management device is registered with the SNMP agent as supporting the capability to additionally receive a set of response PDUs that each contain a partial set of management information, the SNMP agent fragments the set of response varbinds that contains the requested management information into the set of partial response PDUs where each partial response PDU includes a subset of the set of management information requested by the SNMP managed device. The subset of the set of response varbinds included in a partial response PDU may include any combination of partial and full varbinds. For example, a partial response PDU may include a portion of one varbind or a first complete varbind and a portion of a second varbind. The SNMP agent, in one example, includes as much of the requested management information, e.g., the requested object identifiers ("OIDs") and corresponding data associated with each requested OID, which are stored within the SNMP managed device, in each partial response PDU as will fit in a single response PDU.

The SNMP management device receives the initial response PDU and identifies the initial response PDU as indicating the SNMP "tooBig" error. In addition, if the SNMP management device supports the capability herein, the management device waits for possible additional partial response PDUs to nevertheless convey the data that generated the "too-Big" error. After receiving the partial response PDUs, the SNMP management device extracts the portion of the management information stored within each partial response PDU and combines each portion of management information into the full set of requested management information for processing, analysis, or to display the results of the command to an operator.

In one example, a method includes issuing, with a network management device, a data retrieval command to direct a managed network device to retrieve a set of management variables stored within a database within the managed network device and receiving, with the network management device, a plurality of partial responses from the managed network device, wherein each of the plurality of partial responses is received as a separate messages from the managed network device and includes a different portion of the management variables requested by the data retrieval command. The method further includes executing software on the network management device that combines the plurality of partial responses received from the managed network device into the set of management variables requested by the data retrieval command.

In another example, a network device comprises one or more physical network interfaces for sending and receiving packets and a network management module configured to generate a data retrieval command to direct a managed network device to retrieve a set of management variables stored within a database within the managed network device and send the data retrieval command to the managed network device via the physical network interfaces. The network device further comprises a reconstruction module configured to receive a plurality of partial responses from the managed network device generated by the managed network device in response to receiving the data retrieval command and combine the received plurality of partial response into the set of management variables requested by the data retrieval command, wherein each of the plurality of partial responses is received as a separate message from the managed network device and includes a different portion of the management variables requested by the data retrieval command.

In another example, a system comprises a network management device and a managed network device. The network management device comprises a control unit comprising a network management module configured to issue a data retrieval command to direct the managed network device to retrieve a set of management variables stored within a database of the managed network device and a reconstruction module configured to receive a plurality of partial responses from the managed network device and combine the received plurality of partial responses into the set of management variables requested by the data retrieval command, wherein each of the plurality of partial responses is received as a separate message from the managed network device and includes a different portion of the management variables requested by the data retrieval command. The managed network device comprises a control unit comprising a network management agent module configure to query the database to retrieve the set of management variables specified by the data retrieval command received from the network management device and a deconstruction module configured to fragment the set of management variables retrieved from the database into the plurality of partial responses and send the plurality of partial responses to the network management device.

In another example, a computer-readable storage medium is encoded with instructions for causing one or more programmable processors to issue a data retrieval command to direct a managed network device to retrieve a set of management variables stored within a database within the managed network device and receive a plurality of partial responses from the managed network device, wherein each of the plurality of partial responses is received as a separate message from the managed network device and includes a different portion of the management variables requested by the data retrieval command. The instructions further comprise instructions for causing the one or more programmable processors to combine the plurality of partial responses received from the managed network device into the set of management variables requested by the data retrieval command.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
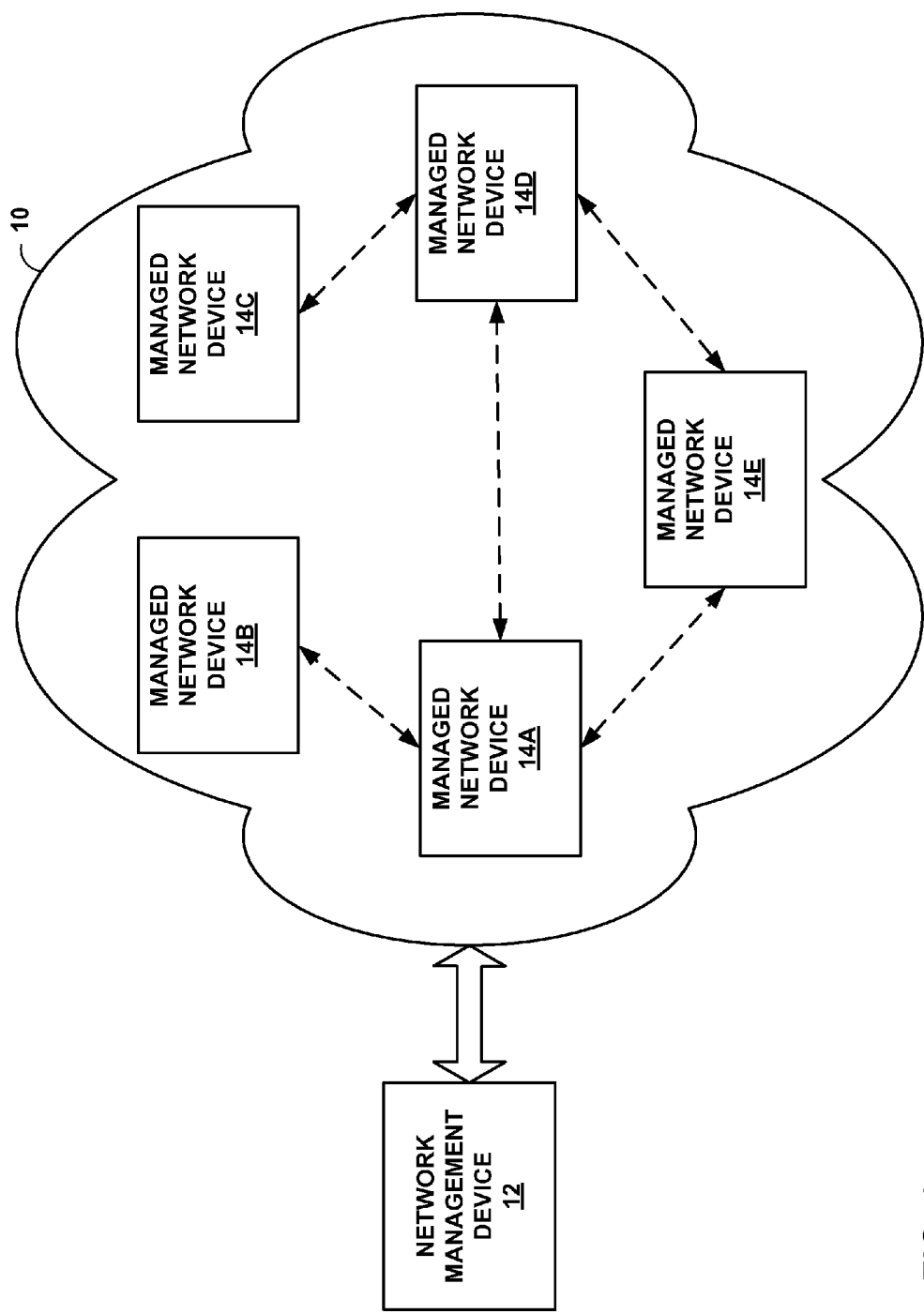
FIG. 1 is a block diagram illustrating an example network of managed network devices managed by a network management device in accordance with the techniques of this disclosure.

FIG. 1 is a block diagram illustrating an example system in which a network 10 includes managed network devices 14A-14E (collectively, "management network devices 14") managed by network management device 12. Network 10 includes managed network devices 14 that facilitate the access of content between various network devices connected to network 10 such as a personal computer, a laptop computer, a mobile telephone, a network telephone, a television set-top box, a video game system, a point-of-sale device, a personal digital assistant, an intermediate network device, a network appliance, or another type of device capable of interfacing with and communicating over network 10. Each managed network device 14 may comprise one or more of a router, a switch, a gateway, a hub, a firewall, an intrusion detection/prevention (IDP) device, and/or any other type of networking equipment or device that facilitates the transfer of data between the various network devices.

Network 10 enables transmission of content between network devices using one or more packet-based protocols, such as an Internet Protocol/Transmission Control Protocol (IP/TCP). In this respect network 10 may support the transmission of data via discrete data units, often referred to as "packets." As a result, network 10 may be referred to as a "packet-based" or "packet switched" network. While described in this disclosure as transmitting, conveying, or otherwise supporting packets, network 10 may transmit data according to any other discrete data unit defined by any other protocol, such as a cell defined by the Asynchronous Transfer Mode (ATM) protocol, or a datagram defined by the User Datagram Protocol (UDP).

Network management device 12 manages one or more of managed network devices 14 using a network management protocol, e.g., SNMP. Network management device 12 may issue commands in accordance with the network management protocol to monitor or control managed network devices 14, e.g., SNMP Get, GetNext, or Set commands. In an example operation, network management device 12 issues a command to direct an SNMP agent executing on a managed network device 14 to retrieve a set of management information. The management information may include configuration and/or operational information. The command includes a request identifier that uniquely identifies that particular request associated with the command. Managed network device 14 receives the request for the set of management information in the form of variable bindings ("varbinds"). The varbinds include a set of name-value pairs of management objects, where the name is the object identifier (OID). Managed network device 14 then retrieves the set of requested OIDs, and determines if the entire set of response varbinds fits within a single response PDU. The size of a single response PDU may be defined by certain configuration parameters of managed network device 14 or by the particular version of SNMP implemented by managed network device 14.

If the set of response varbinds will not fit within a single response PDU, managed network device 14 generates an initial response PDU corresponding to an SNMP "tooBig" error message and sends the initial response PDU to network management device 12. If network management device 12 is registered with managed network device 14 as supporting the capability to additionally receive a set of response PDUs that each contain a partial set of the original response varbinds, managed network device 14 fragments the set of original response varbinds into the set of partial response PDUs where each partial response PDU includes a subset of the set of varbinds requested by network management device 12. The subset of original response varbinds included in a partial response PDU may include any combination of partial and full elements of the management information. For example, a partial response PDU may include a portion of one element of the management information or a first varbind and a second partial varbind. Managed network device 14, in one example, includes as much of the requested management information in each partial response PDU as will fit in a single response PDU.

Network management device 12 receives the initial response PDU and identifies the initial response PDU as indicating the SNMP "tooBig" error. In addition, if network management device 12 supports the capability herein, network management device 12 waits for possible additional partial response PDUs to nevertheless convey the data that generated the "tooBig" error. After receiving all of the partial response PDUs, network management device 12 extracts the portion of the management information (in the form of varbinds) stored within each partial response PDU and combines each portion of management information (in the form of varbinds) into the full set of requested management information for processing, analysis, or to display the results of the command to an operator.

In one example, network management device 12 may start a configurable timer and continue listening for additional response PDUs having the same request identifier as the original request identifier until the configurable timer expires. In another example, after network management device 12 receives all of the partial response PDUs necessary and determines that all of the partial response PDUs corresponding to the original request have been received, network management device 12 stops listening for additional requests. In another example, the configurable timer expires and network management device 12 analyzes all of the received partial response PDUs and determines if one or more partial response PDUs are missing. If one or more partial response PDUs are missing, network management device 12 may issue a second command having the same request identifier and the same requested OIDs as were in the first command to managed network device 14. In another example, network management device 12 receives a partial response PDU corresponding to the last partial response PDU and determines if one or more partial response PDUs are missing. If one or more partial response PDUs are missing, network management device 12 determines if the timer has expired. If the timer has not expired, network management device 12 continues listening for additional partial response PDUs having the same request identifier as the original request identifier.

Figure 2:
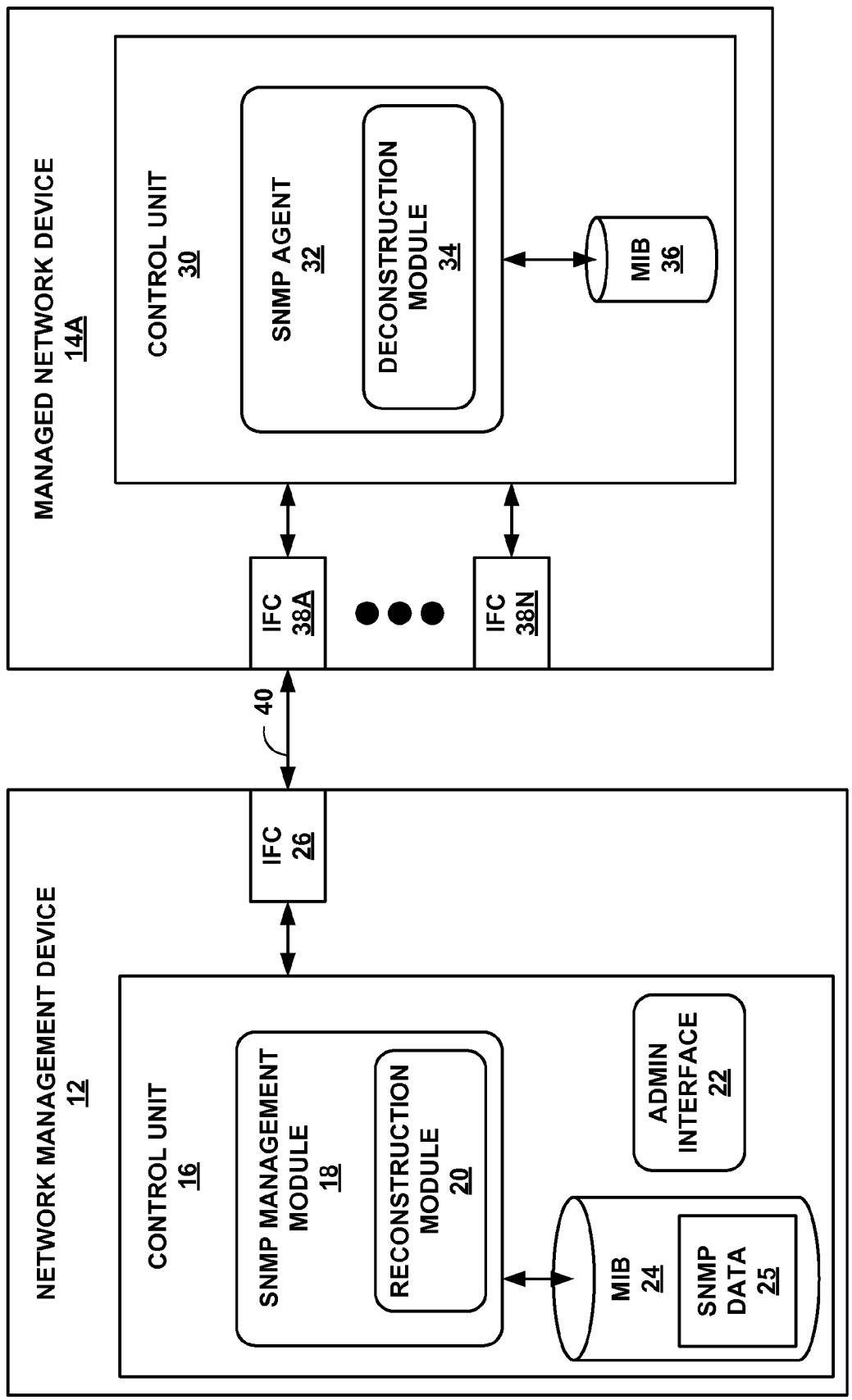
FIG. 2 is a block diagram illustrating an example management system that may implement the techniques described in this disclosure.

FIG. 2 is a block diagram illustrating an example management system in which network management device 12 manages managed network device 14A using a management protocol, such as SNMP. While described with respect to one particular protocol for managing managed network devices, e.g., SNMP, the techniques may apply to any network management protocol by which a management application requests management information from a managed device and by which the managed device responds to the management information request by providing the management application with the requested management information.

In the example of FIG. 2, network management device 12 is coupled to managed network device 14A via network elements 40. Network elements 40 represent communication devices and elements (e.g., switches, routers, links) of a larger network (e.g., network 10 of FIG. 1) that may comprise any type of network capable of transmitting data, such as a layer three (L3) packet-switched network (e.g., the Internet) operating over one or more layer two (L2) networks (e.g., an Ethernet or multi-packet label switching (MPLS) network). Reference to layers in this disclosure should be construed as reference to layers of the Open Systems Interconnection (OSI) reference model, or OSI model for short. The network may include a wide variety of interconnected computing devices or nodes, such as web servers, print servers, application servers, data servers, workstations, desktop computers, laptop computers, cellular or other mobile devices, Personal Digital Assistants (PDAs), and any other device capable of connecting to a computer network via a wireless and/or wired connection.

As shown in the example FIG. 2, network management device 12 includes control unit 16 and interface card ("IFC") 26 and managed network device 14A includes control unit 30 and interface cards 38A-38N (collectively, "IFCs 38"). Network management device 12 and managed network device 14A are connected via network elements 40. Although network elements 40 is illustrated as connecting IFC 26 and 38A, network elements 40 may connect IFC 26 with a different one of IFCs 38. For example, network elements 40 may connect IFC 26 with IFC 38N. It should be understood that the letter "N" is used to represent an arbitrary number of devices.

Control units 16 and 30 may each include one or more processors (not shown in FIG. 2) that execute software instructions, such as those used to define a software or computer program, stored to a computer-readable storage medium (again, not shown in FIG. 2). Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control units 16 and 30 may each comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 16 provides an operating environment for SNMP management module 18 and administrator interface ("ADMIN INTERFACE") 22 and management information base ("MIB") 24. MIB 24 provides a repository for SNMP management data ("SNMP DATA") 25. SNMP management module 18 represents an exemplary instance of an SNMP management application or, more generally, a network management application. SNMP management module 18 is one example of a network management module. SNMP management module 18 monitors and controls one or more of managed network devices 14. An operator interacts with administrator interface 22 to direct SNMP management module 18 to manage the managed network device 14A, e.g., to modify the configuration of managed network device 14A or to monitor the performance of managed network device 14A. For example, the operator may enter commands to view and modify SNMP data 25 and ultimately to deploy the configuration data to MIB 36 of managed network device 14A as operational configuration data of the device. As another example, the operator may enter commands to retrieve the operational data from MIB 36 of managed network device 14A. In another example, SNMP management module 18 may be configured to automatically check the configuration or monitor the performance of network managed device 14A at specified times, e.g. twice per day or once per month. The current configuration of SMNP management module 18 is contained in SNMP data 25. MIB 24 and SNMP data 25 may each be stored in the form of one or more tables, databases, linked lists, radix trees, or other suitable data structure.

In one example, SNMP management module 18 issues a command to manage the managed network device 14A requesting a set of management information from MIB 36 that causes managed network device 14A to return a plurality of partial response PDUs to network management device 12 as described herein. In this example, reconstruction module 20 of SNMP management module 18 combines the plurality of partial responses into the set of management information requested by SNMP management module 18. In general, reconstruction module 20 reconstructs, or combines, two or more partial responses sent to network management device 12 by managed network device 14A into the one or more scalar or tabular objects of SNMP data 25 requested by SNMP management module 18.

Managed network device 14A may be any device having one or more processors and a memory, and that is capable of executing one or more software processes, i.e. SNMP agent 32, that operates in accordance with a network management protocol, such as the SNMP protocol. For example, managed network device may a router, switch, bridge, access server, computer or printer. Managed network device 14A stores management data in a structured form, such as a management information base (MIB) 36. The management data typically defines parameters and settings for a characteristic of a component or element that can be managed, such as a list of currently active interfaces of managed device 14A, information describing the relationships between multiple sub-layers of network interfaces, information describing and providing status information for IEEE 802.3 Medium Attachment Units (MAUs), or the like. MIB 36 may store management data in the form of one or more tables, databases, linked lists, radix trees, or other suitable data structure.

In accordance with the techniques of this disclosure, managed network device 14A may store management data that includes information about one or more network management devices, e.g., network management device 12. For example, MIB 36 may include a table that stores the Internet Protocol (IP) addresses of network management devices that are capable of receiving partial responses from managed network device 14A. One example table format, described using Abstract Syntax Notation (ASN), is as follows:

```
jnxTooBigTable OBJECT-TYPE
    SYNTAX                  SEQUENCE OF JnxTooBigEntry
    MAX-ACCESS              not-accessible
    STATUS                  current
    DESCRIPTION
        "This table contains the IP addresses of those NMS which are capable
        of receiving the partial Response PDUs"
    ::= { XXXX XX}
jnxTooBigEntry OBJECT-TYPE
    SYNTAX                  JnxTooBigEntry
    MAX-ACCESS              not-accessible
    STATUS                  current
    DESCRIPTION
        "This entry contains the authorized NMS IP address"
    INDEX                   { jnxTooBigIndex }
    ::= { jnxTooBigTable 1 }
JnxTooBigEntry ::=
    SEQUENCE {
        jnxTooBigIndex      Unsigned32,
        jnxTooBigIp         IpAddress,
        jnxTooBigRowStatus  RowStatus
    }
jnxTooBigIndex OBJECT-TYPE
    SYNTAX                  Unsigned32
    MAX-ACCESS              not-accessible
    STATUS                  current
    DESCRIPTION
        "Index element."
    ::= { jnxTooBigEntry 1 }
jnxTooBigIp OBJECT-TYPE
    SYNTAX                  IpAddress
    MAX-ACCESS              read-create
    STATUS                  current
    DESCRIPTION
        "NMS IP address."
    ::= { jnxTooBigEntry 2 }
jnxTooBigRowStatus OBJECT-TYPE
    SYNTAX                  RowStatus
    MAX-ACCESS              read-create
```

-continued

```
STATUS              current
DESCRIPTION
    "This object allows entries to be created and deleted in the
    jnxTooBigTable."
::= { jnxTooBigEntry 3 }
```

The above table format example describes a table, named "jnxTooBigTable" that includes three columns, "jnxTooBigIndex", "jnxTooBigIp", and "jnxTooBigRowStatus". The particular names of the column are merely examples and the columns may have any name. Network management device 12 may configure managed network device 14A to control handling of error conditions in the event a response would otherwise exceed an SNMP limit on the response size. Managed network device 14A may be configured to store a master copy of the jnxTooBigTable table structure in MIB 36. The table created within MIB 36 identifies those network management systems that are capable of receiving and reassembling partial-response PDUs, i.e., a series of multiple PDUs that carry a single overall response to a request from a network management system.

In another example, a new configuration option may be introduced under the SNMP hierarchy to allow error handling to be set directly. In this example, an operator interacting with network management device 12 via administrator interface 22 directs SNMP management module 18 to issue a command that sets a value for the new configuration option to indicate that network management device 12 is capable of receiving partial response PDUs from managed network device 14A. The new configuration option may be stored within MIB 36.

When managed network device 14A receives a management data retrieval command from network management device 12, such as Get or GetNext, SNMP agent 32 processes the command and executes one or more queries on MIB 36 to retrieve the appropriate data needed to formulate an SNMP response. The queries executed on MIB 36 correspond to the particular SNMP command sent by SNMP management module 18. For example, an operator or script may use administrator interface 22 to direct SNMP management module 18 of management device 12 to issue a GetNext command, thereby requesting the next configuration object in MIB 36 relative to a current location. In one example, the GetNext command is applied to retrieve tabular objects and requires a set of parameter values including parameters specifying the table of MIB 36 to be queried, the columns of the table to be queried, and a particular row of the table to be queried. The GetNext command is received by SNMP agent 32 of managed network device 14A. SNMP agent 32 then processes the command and queries the table of MIB 36 specified by the parameter values. The query response includes the management information of the next row of the table following the particular row specified by the GetNext parameter values. That is, the query response includes the configuration and/or operational information of the next row of the table following the particular row specified by the GetNext parameter values.

SNMP agent 32 receives the query response from MIB 36 and generates a response PDU, e.g. a get-response PDU in accordance with the SNMP standard. If all of the management information retrieved by the query fits in a single response PDU, the response PDU generated by SNMP agent 32 includes all of the management information and is sent to network management device via one of IFCs 38 and network elements 40. However, if all of the management information received in the query response does not fit in a single response PDU, the response PDU generated by SNMP agent 32 corresponds to a "tooBig" error in accordance with the SNMP standard. SNMP agent 32 then queries MIB 36 to determine if network management device 12 is registered as capable of receiving partial response PDUs. If network management device 12 is not so registered, SNMP agent 32 performs no additional actions with respect to this particular management data retrieval command received from network management device 12.

If network management device 12 is registered as capable of receiving partial response PDUs, deconstruction module 34 separates the management information received in the query response into two or more fragments that each fit within a single response PDU. Response PDUs that include a fragment of the management information to be returned in a single response are referred to as partial response PDUs. Deconstruction module 34 generates as many partial response PDUs as may be required to send all of the requested management information to network management device 12 and sends the plurality of partial response PDUs to network management device 12. Deconstruction module 34 may be configured to minimize the number of partial response PDUs required to transmit all of the requested management information to network management device 12. Moreover, deconstruction module 34 may output the partial response PDUs without receiving any additionally query or command from the requesting network management system, e.g., network management device 12.

When all of the partial response PDUs corresponding to any one particular management data request are received, reconstruction module 20 extracts the embedded partial-response data and formulates the returned response varbinds as if the varbinds were received in a single response PDU. At this point, all of the requested varbind data is available to network management device 12 for processing, analysis, or to display the results of the command to the operator via administrator interface 22.

Figure 3:
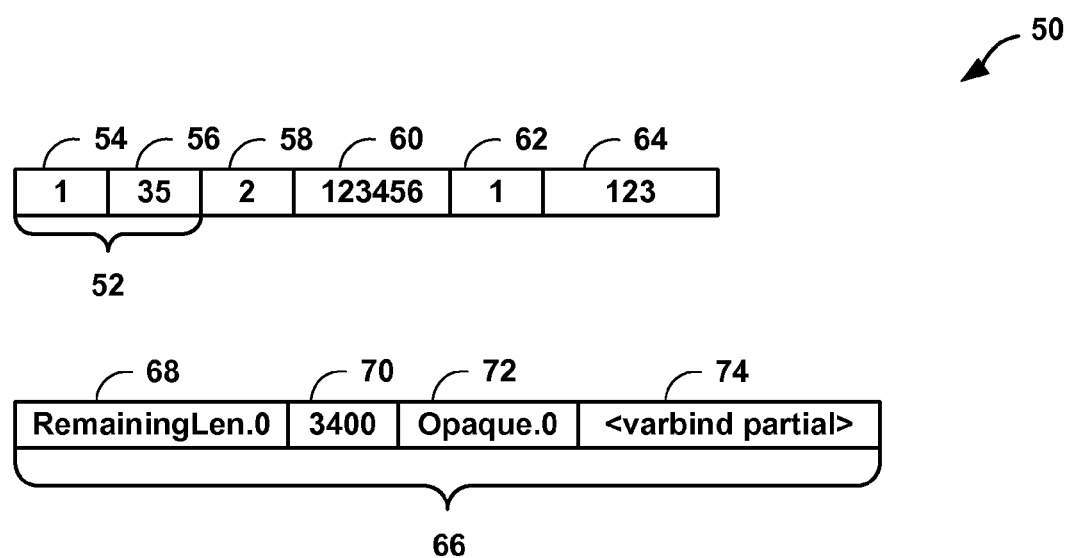
FIG. 3 is an example response that may be generated by a managed network device operating in accordance with the techniques of this disclosure.

FIG. 3 is an example partial response PDU consistent with this disclosure. While the example partial response PDU in FIG. 3 is described with respect to SNMPv2C, the same techniques may be used by other management protocols or other versions of the SNMP protocol. Partial response PDU 50 includes message header 52 that includes version number 54 and community name 56. Version number 54 specifies the version of SNMP that is being used. Community name 56 defines an access environment for a group of network management devices, e.g., network management device 12. PDU type 58 identifies the type of PDU transmitted. For example, if PDU type 58 is set to one, the PDU is identified as a get-next-request PDU, whereas if PDU type 58 is set to two, the PDU is identified as a get-response PDU. In general, a get-response PDU returns the values of one or more variables and is generated in response to a get-request or get-next-request PDU. Request identifier ("request ID") 60 of a get-response PDU is set to the same value as the request ID of the corresponding request. Error status 62 is an integer set by SNMP agent 32, for example, to identify an error condition. Error status 62 having a value of zero identifies that there is no error while error status 62 having a value of one identifies a "tooBig" error. A "tooBig" error signals that the response does not fit in one get-response PDU. Error index 64 specifies which variable was in error when the error occurred.

In the example shown in FIG. 3, partial response PDU 50 corresponds to a first partial response PDU generated by deconstruction module 34. In one example, when generating partial response PDUs, error status 62 is used to store a partial response count. In this example, the partial response count may start at one and be incremented for each additional partial response PDU generated by deconstruction module 34. In another example, error status 62 is used to store the total number of partial responses generated by deconstruction module 34. Error index 64 stores the sequence number that uniquely identifies the particular set of partial responses.

Variable bindings 66 include one or more variable names, e.g., OIDs, and the values associated with each variable name. When generating partial response PDUs consistent with this disclosure, remaining length name 68 and remaining length value 70 are set to the variable name, e.g., RemainingLen.0, and the length of the remaining management information, e.g., the number of remaining bytes. The length of the remaining management information includes the total length of all remaining varbinds of the originally requested varbinds not yet included in a partial response PDU, the length of partial response name 72 for each remaining partial response PDU that is generated, and the length of the partial response name 72 and partial varbind 74 included in the current partial response PDU, e.g., partial response PDU 50. The remaining length does not include the length of any of the variables occurring prior to partial response name 72 in partial response PDU 50. The value of remaining length value 70 is updated for each additional partial response PDU generated by managed network device 14A. Remaining length name 68 may be assigned by the Internet Assigned Numbers Authority (IRNA) or may be a proprietary value.

Partial response name 72 and varbind partial 74 combine to form a name/value pair. In the example illustrated in FIG. 3, partial response name is set to "Opaque.0," but may be set to any value that identifies varbind partial 74 as including a subset of originally requested variable bindings. The value of parital response name 72 may be assigned by IRNA or may be a proprietary value. Varbind partial 74 includes a portion of the original response varbinds. Reconstruction module 20 reads the values stored in varbind partial 74 and combines the values from all of the partial response PDUs to reconstruct the original response varbind.

Network management device 12 may determine if any partial responses are missing by examining the value of error status 62. For example, when error status 62 stores a sequential value, network management device 12 may examine the value of error status 62 to determine if one or more numbers in the sequence of partial response counts is missing. In this example, if the last partial response is missing, network management device 12 will determine that a partial response is missing by examining the remaining length value field 70. Network management device 12 examines the value of the remaining length value field 70 of the partial response with the largest value in error status 62, i.e., the expected last partial response. If the value of the remaining length value field 70 equals the length of the partial response name 72 and the length of varbind partial 74 included in the particular partial response, network device 12 determines that the particular partial response is the last expected partial response. If the value of the remaining length value field 70 is greater than the length of the partial response name 72 and the length of varbind partial 74 included in the particular partial response, network device 12 determines that a partial response is missing.

When error status 62 is used to store the total number of partial responses, network management device 12 may count the number of partial responses received and compare it to the value stored in error status 62. If the number of partial response received by network management device 12 is less than the value of error status 62, at least one partial response is missing.

If network management device 12 does not receive all of the partial response PDUs from managed network device 14A, network management device 12 may issue a second request for the same varbinds. When network management device 12 issues a second request for the same varbind, SNMP agent 32 changes the value of error index 64 to differentiate the second or subsequent set of partial response PDUs sent to network management device 12.

After receiving all of the partial responses, network management device 12 formulates the returned response varbinds as if the varbinds were received in a single response PDU. Reconstruction module 20 examines the values stored in the remaining length value field 70 and determines the proper order in which to reassemble the partial responses. For example, if a first partial response PDU has the remaining length value field 70 set to the value 400 and a second partial response PDU has the remaining length value field 70 set to 1400, reconstruction module 20 understands to append the value of varbind partial 74 of the first partial response PDU to the end of the value of varbind partial 74 of the second partial response PDU. In this manner, reconstruction module 20 determines the proper order for reconstructing the received partial response PDUs, irrespective of the order in which the partial response PDUs were received by SNMP management module 18.

Each subsequent partial response PDUs generated in accordance with the techniques of this disclosure increments the value of error status 62, when error status 62 is used to store a sequential value, and updates the value of remaining length value 70 to reflect the actual length of the partial response name 72 and varbind partial 74 included in the current partial response PDU and subsequent partial response PDUs. For example, if partial response PDU 50 includes 1000 bytes of management information, the second partial response PDU that follows partial response PDU 50 would have error status 62 set to two and remaining length value 70 set to the value 2400. The value 2400 is determined by taking the total length of all of the requested OIDs and the length of partial response name 72 in each partial PDU, i.e. 3400 bytes, which is the value of remaining length value 70 shown in partial response PDU 50, and subtracting the length of partial response name 72 and varbind partial 74 included in partial response PDU 50, which is 1000 bytes.

Figure 4:
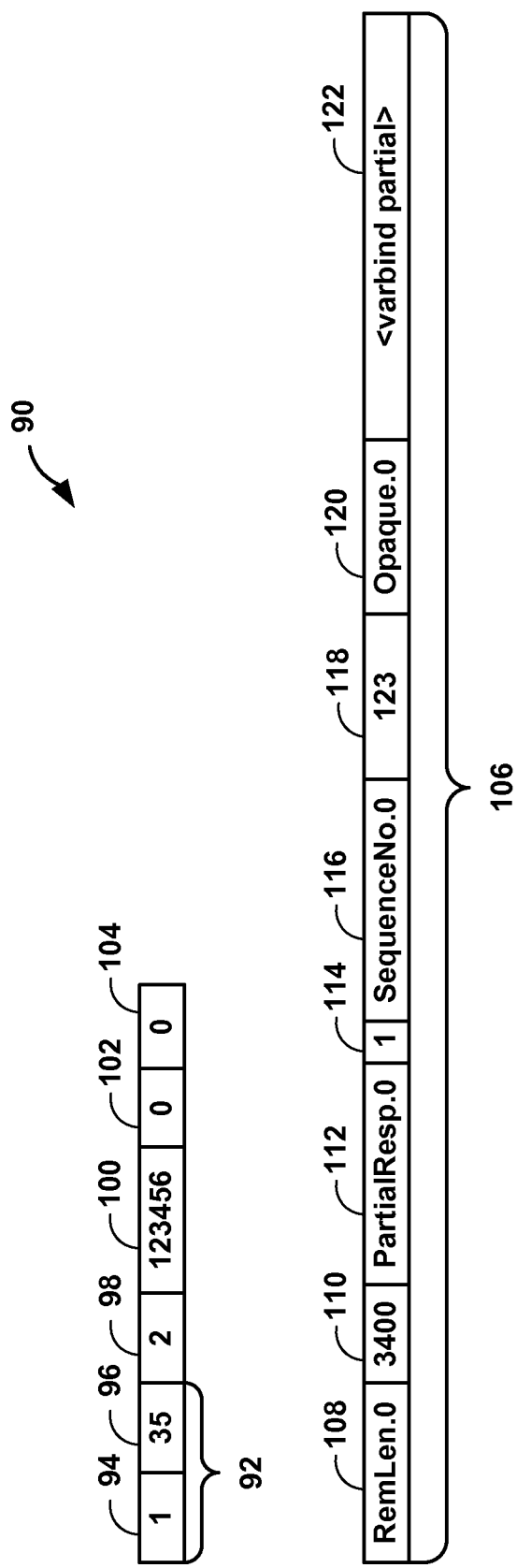
FIG. 4 is a second example response that may be generated by a managed network device operating in accordance with the techniques of this disclosure.

An alternative format for a partial response PDU is illustrated in FIG. 4. While the example partial response PDU in FIG. 4 is described with respect to SNMPv2C, the same techniques may be used by other management protocols or other versions of the SNMP protocol. If, for example, error status 62 and error index 64 are too small to store partial response count and sequence number values as described with respect to partial response PDU 50 of FIG. 3, managed network device 14A may generate an alternative a partial response PDU in accordance with the alternative format as shown in the example illustrated in FIG. 4. In another example, managed network device 14A may be configured to always generate partial response PDUs in accordance with the alternative format. In another example, managed network device 14A may be configured to dynamically switch between generating partial response PDUs in accordance with the format illustrated in FIG. 3 and the alternative format illustrated in FIG. 4. Network management device 12 may be configured to analyze each partial response PDU received from managed network device 14A and determine the format of each partial response PDU.

As shown in FIG. 4, partial response PDU 90 maintains the same basic format as partial response PDU 50. That is, partial response PDU 90 includes message header 92 that includes version number 94 and community name 96. Partial response PDU 90 also includes PDU type 98, request ID 100, error index 102, error status 104, and variable bindings 106. In general, each of these elements corresponds to the elements of the same name in partial response PDU 50. However, error index 102 and error status 104 are not used to indicate the partial response number and the partial response sequence number as described with respect to partial response PDU 50. Rather, error index 102 and error status 104 are used as standard error index and error status fields in accordance with the SNMP standard.

Variable bindings 106 includes three particular variable name/value pairs consistent with this disclosure. In particular, remaining length name 108 and remaining length value 110 are set to the variable name and the length of the remaining management information, e.g., the number of remaining bytes. The length of the remaining management information includes the total length of all remaining varbinds of the originally requested varbinds not yet included in a partial response PDU, the length of partial response name 120 for each remaining partial response PDU that is generated, and the length of the partial response name 120 and partial varbind 122 included in the current partial response PDU, e.g., partial response PDU 90. The remaining length does not include the length of any of the variables occurring prior to partial response name 120 in partial response PDU 90. The value of remaining length value 110 is updated for each additional partial response PDU generated by managed network device 14A.

Partial response PDU 90 incorporates two name/value pairs in variable bindings 106 not included in partial response PDU 50. The partial response count name 112 and partial response count value 114 name/value pair keeps track of the number of partial response PDUs generated by managed network device. In one example, when generating partial response PDUs, partial response count value 114 is used to store a partial response count. In this example, the value of partial response count value 114 may start at the value one and is incremented for each additional partial response PDU generated by deconstruction module 34. In another example, partial response count value 114 is used to store the total number of partial responses generated by deconstruction module 34.

The sequence number name 116 and sequence number value 118 name/value pair is used to store the sequence number for the series of partial response PDUs generated in response to the original management information request. Sequence number value 118 is used to differentiate a second or subsequent set of partial response PDUs sent to network management device 12 in response to a second or subsequent request for the same configuration parameters with the same request ID 100.

Partial response name 120 is set to "Opaque.0," but may be set to any value that identifies varbind partial 122 as including a subset of originally requested variable bindings. The value of partial response name 120 may be assigned by IRNA or can by a proprietary value. Varbind partial 122 includes a portion of the original response varbinds. Reconstruction module 20 reads the values stored in varbind partial 122 and combines the values from all of the partial response PDUs to reconstruct the original response varbind.

Figure 5:
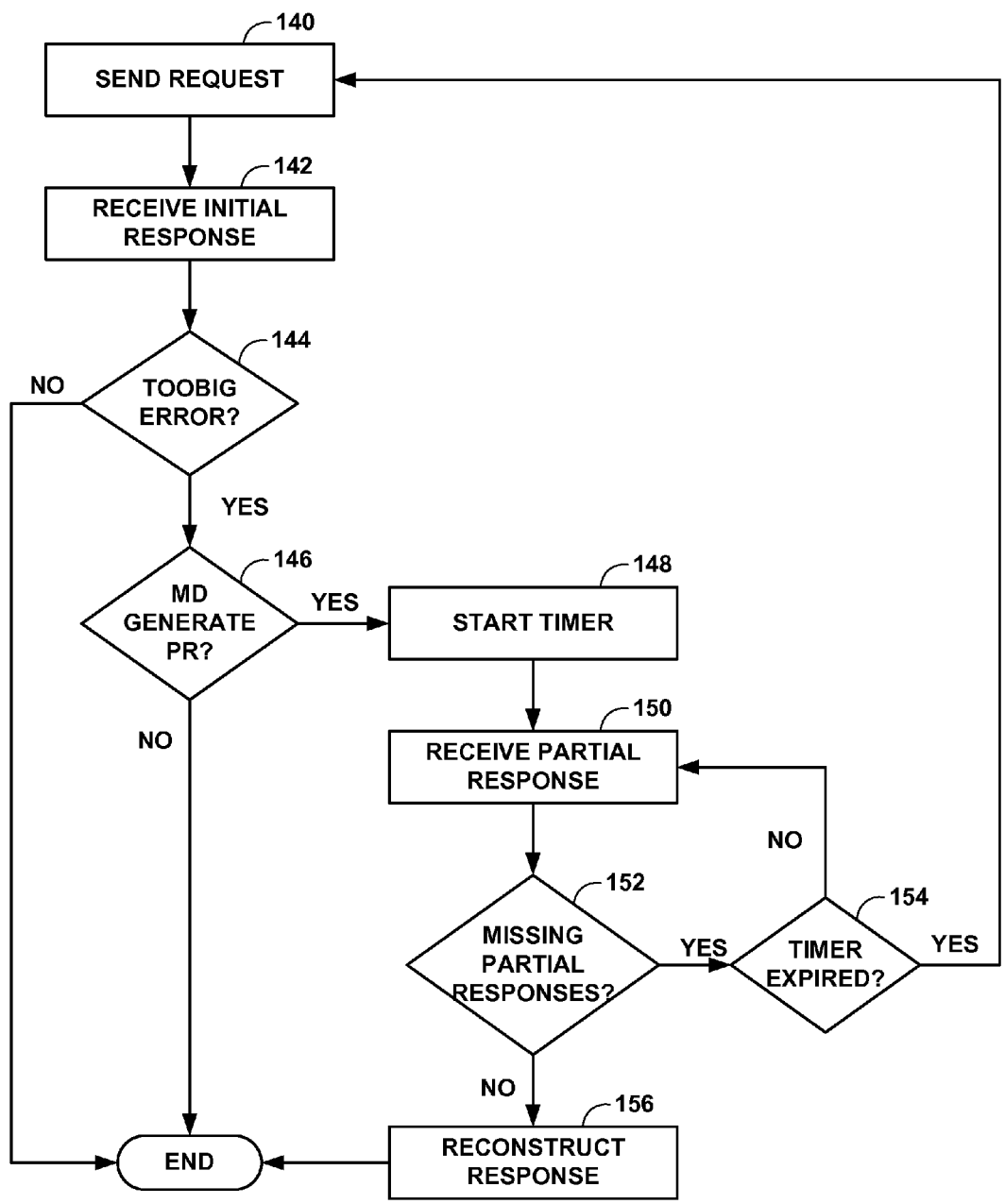
FIG. 5 is a flowchart illustrating an example method for a network management device operating in accordance with the techniques of this disclosure.

FIG. 5 is a flowchart illustrating an example method for a network management device operating in accordance with the techniques of this disclosure. For purposes of clarity, the method shown in FIG. 5 will be described with respect to network management device 12 and managed network device 14A shown in FIG. 2. Network management device 12 generates and sends a data retrieval command to managed network device 14A (140). Generating and sending the data retrieval command may also be referred to as issuing the data retrieval command. The data retrieval command may be any command that retrieves management data from a managed network device in accordance with a network management protocol, e.g., a Get or GetNext request as defined in the SNMP protocol. In particular, SNMP management module 18 generates the data retrieval command and sends the data retrieval command to managed network device via IFC 26 and network elements 40. The data retrieval command includes a request ID that identifies the issued data retrieval command and is used to associate any responses with the issued data retrieval command.

Network management device 12 receives an initial response from managed network device 14A (142) and analyzes the response to determine if the response corresponds to a "tooBig" error (144). In analyzing the response, SNMP management module 18 examines the error status field of the response, e.g., error status 62 of FIG. 3 or error status 102 of FIG. 4. If the error status field of the initial response is set to some other value ("NO" branch of 144), SNMP management module 18 processes the initial response in accordance with SNMP. If the error status field is set to one, SNMP management module 18 determines that the initial response indicates a "tooBig" error ("YES" branch of 144). In one example, when SNMP management module 18 identifies a "tooBig" error ("YES" branch of 144), SNMP management module 18 performs a look up of current configuration data stored within SNMP data 25 to determine if managed network device 14A is capable of generating partial responses (146). If managed network device 14A is not capable of generating partial responses ("NO" branch of 146), SNMP management module 18 processes the initial response in accordance with SNMP. If managed network device 14A is capable of generating partial responses ("YES" branch of 146), SNMP management module 18 begins a configurable timer (148). The configurable timer specifies a limited duration during which SNMP management module 18 listens for partial responses from managed network device 14A that correspond to the request issued in block 140 as identified by the request ID.

SNMP management module 18 examines the request ID of each response received by network management device 12 to determine if any particular response is associated with the original request. If a request ID matches the request ID of the original request and if the first object identifier, i.e., the first variable name in variable bindings 66 of FIG. 3 or variable bindings 106 of FIG. 4, is set to "RemainingLen.0", the response is identified as a received partial response (150). In one example, reconstruction module 20 may examine the remaining length variable name/value pair of each partial response to determine if the partial response is the last expected partial response. For example, if the value of the remaining length variable equals the total length of the partial response name 72 of FIG. 3 or partial response name 120 of FIG. 4 and the length of varbind partial 74 of FIG. 3 or partial varbind 122 of FIG. 4 in the particular partial response, reconstruction module 20 determines that the particular partial response is the last expected partial response. Reconstruction module 20 determines the format of each partial response by examining the variable bindings of each partial response. If, for example, the variable bindings do not include the partial response count and sequence number name/value pairs, reconstruction module 20 determines that the partial response has the format illustrated in FIG. 3. If the partial response count and sequence number name/value pairs are present in the variable bindings, reconstruction module 20 determines that the partial response has the format illustrated in FIG. 4.

After determining the format of each partial response, reconstruction module 20 determines if any partial responses are missing from the sequence of received partial responses (152). Reconstruction module 20 analyzes the appropriate fields for each partial response format to determine if any partial response counts are missing from the sequence of partial responses, where each partial response has the same sequence number. That is, reconstruction module 20 examines the partial responses received from the same request, as indicated by the request ID field, to determine if any partial responses are missing. One or more partial response may be missing if one or more numbers in the sequence is missing when the partial response count is a sequence of numbers or if the number of received partial responses is less than the value of the partial response count field when the partial response count is set to the total number of generated partial responses, for example.

If no partial responses are missing, reconstruction module 20 reconstructs the original response varbind. In one example, reconstruction module 20 reconstructs the original response varbind by assembling the variables in the order indicated by the incremented partial response count value (156). The variables stored within the partial response having a partial response count of one are first, with the varbinds stored within the partial response having a partial response count of two are appended to the end of the of the first set of varbinds extracted from the first partial response. This process repeats until the varbinds are extracted from each partial response. In another example, if the partial response count is set to a total number of generated partial responses, reconstruction module 20 reconstructs the partial response in decremented order of remaining length value. That is, a partial response PDU whose remaining length value is set to the largest remaining length value contains the first set of partial response varbinds. The partial response PDU whose remaining length value is set to the next largest value contains the second set of partial response varbinds. Reconstruction module 20 continues in this manner until no partial response PDUs remain. After the full response is reconstructed by reconstruction module 20 (156), the full set of requested management information (in the form of varbinds) is available to network management device 12 for processing, analysis, or to display the results of the command to the operator via administrator interface 22.

If reconstruction module 20 determines that one or more partial responses are missing ("YES" branch of 152), reconstruction module 20 determines if the configurable timer has expired (154). If the configurable timer has not expired ("NO" branch of 154), SNMP management module 18 continues listening for additional partial responses (150). If the configurable time has expired ("YES" branch of 154), SNMP management module 18 may issue a second management information request (140). In one example, one or more missing partial responses may indicate network problems. In this example, network management device 12 may issues a second request for the same OIDs as the first request that has the same request ID as the first command.

While the example method illustrated in FIG. 5 is described with respect to polling the configurable timer to determine whether the timer has expired after receiving a one or more partial responses, SNMP management module 18 may be configured in an interrupt-driven manner such that the configurable timer sends an interrupt when the configurable timer expires. When reconstruction module 20 receives an interrupt from the configurable timer, reconstruction module 20 may determine if any partial responses are missing from the set of received partial responses in the same manner as described with respect to block 152. If there are missing partial responses, SNMP management module 18 may issue a second management information request having the same request ID as the first request (140). If there are no missing partial responses, reconstruction module 20 reconstructs the received varbinds as described above (156).

Figure 6:
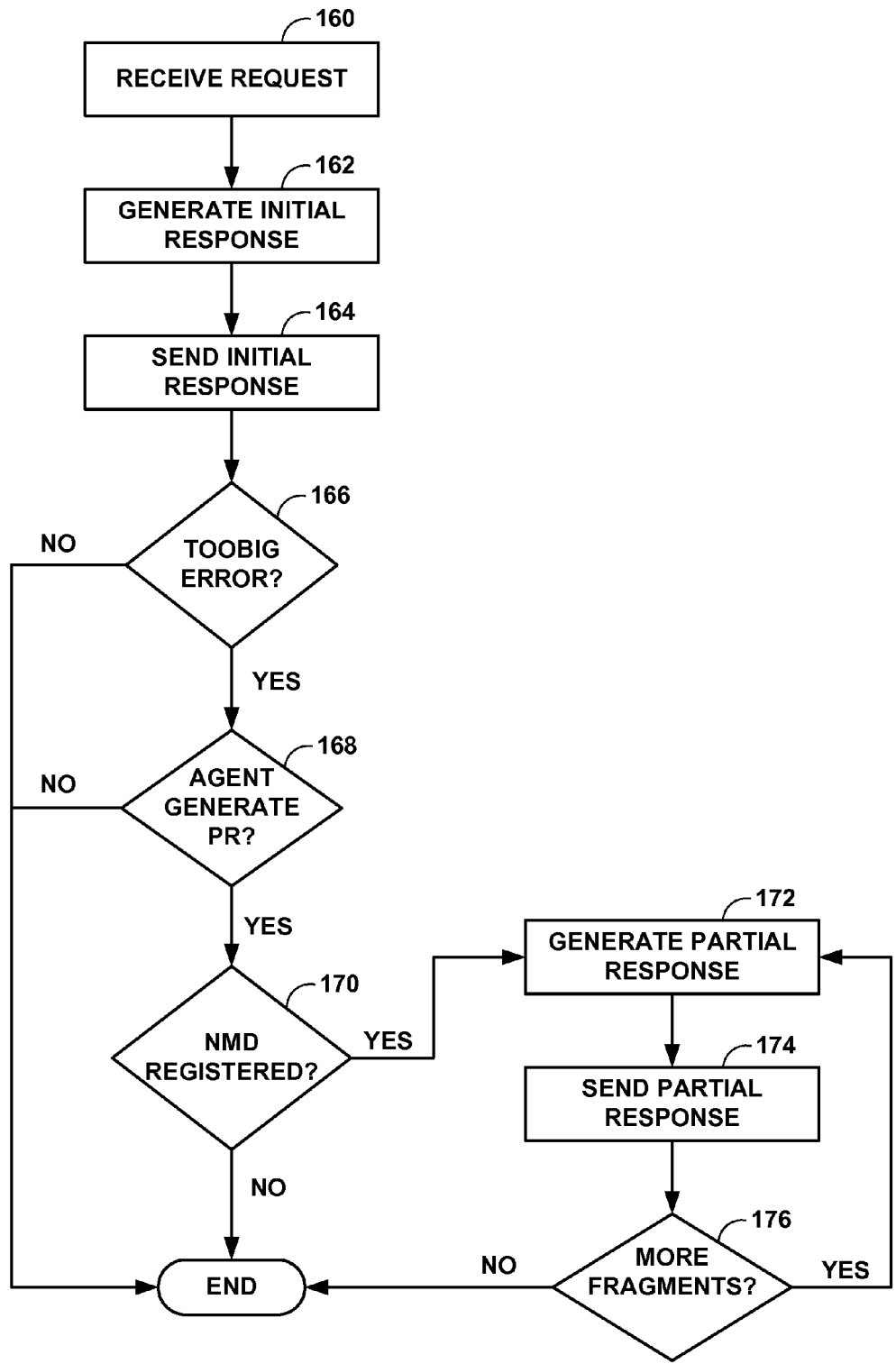
FIG. 6 is a flowchart illustrating an example method for a managed network device operating in accordance with the techniques of this disclosure.

FIG. 6 is a flow chart illustrating an example method for a managed network device operating in accordance with the techniques of this disclosure. For purposes of clarity, the method shown in FIG. 6 will be described with respect to network management device 12 and managed network device 14A shown in FIG. 2. Managed network device 14A receives a management data request command from network management device 12 (160) via one of IFCs 38 and network elements 40. SNMP agent 32 processes the request and generates a response (162) by executing a query against MIB 36 to retrieve the requested management information and analyzing the retrieved management information. SNMP agent 32 then generates an initial response in accordance with a management protocol, e.g., the SNMP protocol. If the retrieved management information will not fit in a single response, SNMP agent 32 generates an initial response corresponding to an SNMP "tooBig" error (162) by setting the error status of the response to the value one, which indicates a "tooBig" error. If the retrieved management information fits in a single response, SNMP agent 32 generates a response that includes all of the requested management information. SNMP agent 32 may determine if all of the retrieved management information will fit within a single response by determining how many bytes are included in the retrieved management information and comparing it to the maximum total length allowed for the variable bindings portion of the response in accordance with the requirements of the version of SNMP deployed on the managed device. If the number of bytes included in the retrieved management information is greater than the maximum allowed size for the variable bindings, the retrieved management information will not fit in a single response. SNMP agent 32 then sends the initial response, i.e., tooBig error, to network management device 12 (164).

If the SNMP agent 32 did not generate a response indicating a "tooBig" error ("NO" branch of 166), SNMP agent 32 is done processing the request. If SNMP agent 32 generated a "tooBig" error ("YES" branch in 166), SNMP agent 32 determines if managed network device 14A is capable of generating and sending partial responses (168). If SNMP agent 32 is not configured to generate partial responses ("NO" branch of 168), SNMP agent 32 is done processing the request. If SNMP agent 32 is configured to generate partial responses ("YES" branch of 168), SNMP agent 32 determines if network management device 12 is registered as capable of receiving and processing a plurality of partial SNMP responses in response to its SNMP request (170). In one example, SNMP agent 32 queries a table of MIB 36 that stores IP addresses of network management devices registered and therefore capable of receiving partial responses to determine if the IP address of network management device 12 is included in the table. If network management system 12 is not registered as capable of receiving partial responses, SNMP agent is done processing the request ("NO" branch of 170). If network management system 12 is registered as capable of receiving partial responses ("YES" branch of 170), deconstruction module 34 of SNMP agent 32 splits the retrieved management information into fragments such that the size of the fragments minimizes the number of partial responses packets required to send the response varbinds to network management device 12, for example. In another example, deconstruction module 34 may generate a fragment by extracting the maximum number of bytes that will fit in the variable bindings of a single response from the management information. In this example, deconstruction module 34 extracts the maximum number of bytes in sequential order and starting at the beginning of the retrieved management information.

Deconstruction module 34 then generates a partial response based on the original response that includes the first fragment of management information (172). Deconstruction module 34 may be configured to only generate partial responses formatted according to the example in FIG. 3, the example in FIG. 4, or a combination of the formats of FIGS. 3 and 4. If deconstruction module 34 is configured to change formats in a single set of partial responses, deconstruction module 34 may start by generating partial responses in accordance with the example shown in FIG. 3 and then switch to the format shown in FIG. 4 upon determining that the partial response count is too large to fit in the error status field, for example.

After the first partial response is generated, SNMP agent 32 sends the partial response to network management device 12 (174) via one of IFCs 38 and network elements 40. Deconstruction module 34 determines if any additional management information, which may be in the form of one or more fragments, needs to be incorporated into additional partial responses (176). If there is additional management information remaining ("YES" branch of 176), deconstruction module 34 generates the next partial response (172). In generating the next partial response (172), deconstruction module 34 sets remaining length to the length of the remaining management information, which includes the length of the partial response name field and the length of the varbind partial field for each subsequently generated partial response, plus the length of the partial varbind name and value included in the current partial response PDU and sets the value of partial response count. For example, deconstruction module 34 may determine how many partial responses will need to be generated by examining the total length of the requested OIDs. Based on the determined number of partial responses, deconstruction module 34 determines the total length required to send the requested OIDs and sets the value of the remaining length field of the first partial response to the total length. In one example, deconstruction module 34 sets the partial response count by incrementing the partial response count. In another example, deconstruction module 34 sets the partial response count by determining the total number of partial response PDUs required and setting the partial response count to the total number of partial response PDUs. After deconstruction module 34 generates all of the required partial responses and SNMP agent 32 has sent all of the partial responses to network management device, no additional configuration remains ("NO" branch of 176) and SNMP agent 32 stop processing the request.

If network management device 12 generates a second request for the same management information, i.e., the second request has the same value for the request ID field as the first request, managed network device 14 generates a response to the second request in the same manner as managed network device 14 generated the response to the first request, but including a sequence number that is different from the sequence number included with the first response.

In this manner the efficient of device management data retrieval commands may be optimized between network management devices and managed network devices capable of performing the techniques of this disclosure while maintaining compatibility with conventional network management devices. The techniques of this disclosure may minimize the bandwidth required for retrieving a set of management information, while ensuring that all variables requested by a network management device are successfully received by the network management device. Further, the techniques of this disclosure enable the transmission of a single management variable that is too large to fit within a single response.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
  issuing, with a network management device, a data retrieval command to direct a managed network device to retrieve a set of management variables stored within a database within the managed network device;
  receiving, with the network management device, an initial response from the managed network device, the initial response indicating an error;
  receiving, with the network management device and without issuing a second data retrieval command to the managed network device to retrieve the set of management variables, a plurality of partial responses from the managed network device, wherein each of the plurality of partial responses is received as a separate message from the managed network device and includes a different portion of the set of management variables requested by the data retrieval command;

executing software on the network management device that analyzes the received plurality of partial responses, wherein each received partial response comprises a partial response counter, a sequence number, and a remaining length, and wherein the software analyzes the partial response counter, the sequence number, and the remaining length of each received partial response to determine if one or more partial response are missing from the plurality of received partial responses;

responsive to determining that one or more partial responses are missing from the plurality of received partial responses, issuing, with the network device, the second data retrieval command to the managed network device to retrieve the set of management variables; and responsive to determining that no partial responses are missing from the plurality of received partial responses, executing software on the network management device that combines the plurality of partial responses received from the managed network device into the set of management variables requested by the data retrieval command.

2. The method of claim 1, wherein the set of management variables comprises at least one of configuration variables and operational variables.

3. The method of claim 1, wherein the set of management variables includes one management variable, wherein the one management variable is conveyed as a variable binding of a representing element of management data, and wherein combining the plurality of partial responses comprises combining the plurality of partial responses received from the managed network device into the variable binding.

4. The method of claim 1, wherein the remaining length and the different portion of the management variables of each partial response are conveyed as variable bindings.

5. The method of claim 4, wherein the partial response counter and the sequence number of each partial response are conveyed as variable bindings.

6. The method of claim 1, wherein the error is a Simple Network Management Protocol (SNMP) tooBig error.

7. The method of claim 1, further comprising:
starting a configurable timer after receiving the initial response from the managed network device;
if one or more partial responses are missing after the configurable timer expires, issuing, with the network management device, the second data retrieval command to direct the managed network device to retrieve the set of management variables.

8. A network management device comprising:
one or more physical network interfaces for sending and receiving packets;
a network management module to generate a data retrieval command to direct a managed network device to retrieve a set of management variables stored within a database within the managed network device and send the data retrieval command to the managed network device via the physical network interfaces; and
a reconstruction module to receive an initial response from the managed network device, the initial response indicating an error, receive, without the network management module issuing a second data retrieval command to the managed network device to retrieve the set of management variable, a plurality of partial responses from the managed network device generated by the managed network device in response to receiving the data retrieval command, wherein each partial response comprises a partial response counter, a sequence number, and a remaining length, analyze the partial response counter, the sequence number, and the remaining length of each partial response of the received plurality of partial responses to determine if one or more partial responses are missing from the received plurality of partial responses, responsive to determining that one or more partial responses are missing from the received plurality of partial responses, issue a second data retrieval command to direct the managed network device to retrieve the set of management variables, and, responsive to determining that no partial responses are missing from the plurality of received partial responses, combine the received plurality of partial response into the set of management variables requested by the data retrieval command, wherein each of the plurality of partial responses is received as a separate message from the managed network device and includes a different portion of the set of management variables requested by the data retrieval command.

9. The network management device of claim 8, wherein the set of management variables comprises at least one of configuration variables and operational variables.

10. The network management device of claim 8, wherein the set of management variables includes one management variable, wherein the one management variable is conveyed as a variable binding of a representing element of management data, and wherein the reconstruction module combines the received plurality of partial responses into the variable binding.

11. The network management device of claim 8, wherein the remaining length and the different portion of the management variables of each partial response are conveyed as variable bindings.

12. The network management device of claim 11, wherein the partial response counter and the sequence number of each partial response are conveyed as variable bindings.

13. The network management device of claim 8, wherein the error is a Simple Network Management Protocol (SNMP) tooBig error.

14. The network management device of claim 8,
wherein the reconstruction module is further configured to start a configurable timer after receiving the initial response from the managed network device, and
if one or more partial responses are missing after the configurable timer expires, the network management module is further configured to issue a second data retrieval command to direct the managed network device to retrieve the set of management variables.

15. A system comprising:
a network management device; and
a managed network device,
wherein the network management device comprises:
a network management module to issue a data retrieval command to direct the managed network device to retrieve a set of management variables stored within a database of the managed network device; and
a reconstruction module to receive an initial response from the managed network device, the initial response indicating an error, receive, without the network management module issuing a second data retrieval command to the managed network device to retrieve the set of management variable, a plurality of partial responses from the managed network device, wherein each partial response comprises a partial response counter, a sequence number, and a remaining length, analyze the partial response counter, the sequence number, and the remaining length of each partial response of the received plurality of partial responses to determine if one or more partial responses are missing from the received plurality of partial responses, responsive to determining that one or more partial responses are missing from the received plurality of partial responses, issue a second data retrieval command to direct the managed network device to retrieve the set of management variables, and, responsive to determining that no partial responses are missing from the plurality of received partial responses, combine the received plurality of partial responses into the set of management variables requested by the data retrieval command, wherein each of the plurality of partial responses is received as a separate message from the managed network device and includes a different portion of the set of management variables requested by the data retrieval command, and wherein the managed network device comprises a control unit comprising:

a network management agent module to query the database to retrieve the set of management variables specified by the data retrieval command received from the network management device; and a deconstruction module to fragment the set of management variables retrieved from the database into the plurality of partial responses and send the plurality of partial responses to the network management device.

16. The system of claim 15, wherein the set of management variables comprises at least one of configuration variables and operational variables.

17. The system of claim 15, wherein the set of management variables includes one management variable, wherein the one management variable is conveyed as a variable binding of a representing element of management data, and wherein the reconstruction module combines the received plurality of partial responses into the variable binding.

18. The system of claim 15, wherein the remaining length and the different portion of the management variables of each partial response are conveyed as variable bindings.

19. The system of claim 18, wherein the partial response counter and the sequence number of each partial response are conveyed as variable bindings.

20. The system of claim 15, wherein the error is a Simple Network Management Protocol (SNMP) tooBig error.

21. The system of claim 15,
wherein the reconstruction module starts a configurable timer after receiving the initial response indicating the error from the managed network device, and
if one or more partial responses are missing after the configurable timer expires, the network management module issues a second data retrieval command to direct the managed network device to retrieve the set of management variables.

22. The system of claim 15, wherein the network management agent module determines whether the network management device is registered as being configured to receive partial responses, and, responsive to determining that the network management device is registered as being configured to receive partial responses, sends the plurality of partial responses.

23. A non-transitory computer-readable storage medium encoded with instructions for causing one or more programmable processors to:

issue a data retrieval command to direct a managed network device to retrieve a set of management variables stored within a database within the managed network device;

receive an initial response from the managed network device, the response indicating an error;

receive, without issuing a second data retrieval command to the managed network device to retrieve the set of management variables, a plurality of partial responses from the managed network device, wherein each of the plurality of partial responses is received as a separate message from the managed network device and includes a different portion of the set of management variables requested by the data retrieval command;

analyze the received plurality of partial responses, wherein each received partial response comprises a partial response counter, a sequence number, and a remaining length, and wherein the software analyzes the partial response counter, the sequence number, and the remaining length of each received partial response to determine if one or more partial response are missing from the plurality of received partial responses;

responsive to determining that one or more partial responses are missing from the plurality of received partial responses, issue the second data retrieval command to the managed network device to retrieve the set of management variables; and responsive to determining that no partial responses are missing from the plurality of received partial responses, combine the plurality of partial responses received from the managed network device into the set of management variables requested by the data retrieval command.

24. The non-transitory computer-readable storage medium of claim 23, wherein the set of management variables comprises at least one of configuration variables and operational variables.

25. The non-transitory computer-readable storage medium of claim 23,
wherein the set of management variables includes one management variable, wherein the one management variable is conveyed as a variable binding of a representing element of management data, and
wherein the instructions further comprise instructions for causing the one or more programmable processors to combine the plurality of partial responses received from the managed network device into the variable binding.

26. The non-transitory computer-readable storage medium of claim 23, wherein the remaining length and the different portion of the management variables of each partial response are conveyed as variable bindings.

27. The non-transitory computer-readable storage medium of claim 26, wherein the partial response counter and the sequence number of each partial response are conveyed as variable bindings.

28. The non-transitory computer-readable storage medium of claim 23, wherein the error is a Simple Network Management Protocol (SNMP) tooBig error.

29. The non-transitory computer-readable storage medium of claim 23,
wherein the instructions further comprise instructions for causing the one or more programmable processors to:
start a configurable timer after receiving the initial response from the managed network device; and
if one or more partial responses are missing after the configurable timer expires, issue a second data retrieval command to direct the managed network device to retrieve the set of management variables.

* * * * *